US012672615B2

(12) United States Patent
Montagano

(10) Patent No.: US 12,672,615 B2
(45) Date of Patent: Jul. 7, 2026

(54) PLANT ENCLOSURE WITH VERTICALLY DISTRIBUTED LIGHT SOURCES

(71) Applicant: MONDI PRODUCTS LTD.,
Vancouver (CA)

(72) Inventor: Michael Montagano, Vancouver (CA)

( * ) Notice: Subject to any disclaimer, the term of this patent is extended or adjusted under 35 U.S.C. 154(b) by 9 days.

(21) Appl. No.: 17/633,537

(22) PCT Filed: Aug. 6, 2020

(86) PCT No.: PCT/CA2020/051073
§ 371 (c)(1),
(2) Date: Feb. 7, 2022

(87) PCT Pub. No.: WO2021/022373
PCT Pub. Date: Feb. 11, 2021

(65) Prior Publication Data
US 2022/0346327 A1     Nov. 3, 2022

Related U.S. Application Data

(60) Provisional application No. 62/884,468, filed on Aug. 8, 2019.

(51) Int. Cl.
*A01G 9/24*          (2006.01)
(52) U.S. Cl.
CPC .............. *A01G 9/243* (2013.01); *A01G 9/249* (2019.05)
(58) Field of Classification Search
CPC ....... A01G 9/249; A01G 7/045; A01G 13/105
See application file for complete search history.

(56) References Cited

U.S. PATENT DOCUMENTS

| | | | |
|---|---|---|---|
| 1,939,583 A | 12/1933 | Welshausen | |
| 1,974,068 A | 9/1934 | Greensaft | |

(Continued)

FOREIGN PATENT DOCUMENTS

| | | | |
|---|---|---|---|
| CA | 2814304 A1 | 10/2014 | |
| CA | 3003437 A1 | 7/2018 | |

(Continued)

OTHER PUBLICATIONS

Montagano, Michael; Advisory Action for U.S. Appl. No. 16/181,692, filed Nov. 6, 2018, mailed Jun. 7, 2022, 3 pgs.

(Continued)

*Primary Examiner* — Joshua D Huson
*Assistant Examiner* — Alanna K Peterson
(74) *Attorney, Agent, or Firm* — Olive Law Group, PLLC

(57)          ABSTRACT

A system for lighting a plant comprising a dome/cage defining a volume that receives, surrounds and covers the plant. A plurality of light sources are supported by the dome/cage and distributed vertically from a bottom to a top and around the dome/cage to illuminate the plant evenly. The system is adapted to control the light sources to project light in the dark, extend ambient light hours, increase an intensity of an existing light; and modify a spectrum of the existing light in accordance with growth requirements specific to a given plant growing in a specific environment. A solar panel may be connected to the lights directly or through a battery for operating the system as a standalone unit. A control unit may be provided to receive a user input setting a lighting program, to allow the system to control operation of the lights using the set program.

30 Claims, 10 Drawing Sheets

(56) References Cited

U.S. PATENT DOCUMENTS

| | | | |
|---|---|---|---|
| 3,225,736 A | 12/1965 | Willinger et al. | |
| 3,232,272 A | 2/1966 | De Jose et al. | |
| 3,834,351 A | 9/1974 | Schmidt | |
| 4,026,243 A | 5/1977 | Jessop, III | |
| 4,170,844 A | 10/1979 | Steele | |
| 4,543,744 A | 10/1985 | Royster | |
| 4,850,135 A | 7/1989 | Demarco | |
| 4,952,511 A | 8/1990 | Radmer | |
| 5,353,746 A | 10/1994 | Del Rosario | |
| 5,664,866 A | 9/1997 | Reniger et al. | |
| 5,950,563 A | 9/1999 | Adcock, Jr. | |
| 7,987,632 B2 | 8/2011 | May et al. | |
| 10,179,694 B2 | 1/2019 | Fenner, Jr. | |
| 10,237,956 B2 | 3/2019 | Grajcar | |
| 10,842,082 B1 | 11/2020 | Genga | |
| 11,166,417 B2 | 11/2021 | Montagano | |
| 11,627,707 B1 | 4/2023 | Leichtle et al. | |
| 11,910,766 B2 | 2/2024 | Montagano | |
| 2001/0030865 A1 | 10/2001 | Glowachk, Sr. et al. | |
| 2005/0086858 A1 | 4/2005 | Schmidt | |
| 2007/0058368 A1 | 3/2007 | Partee et al. | |
| 2008/0222949 A1 | 9/2008 | Bissonnette et al. | |
| 2009/0190336 A1 | 7/2009 | Teng et al. | |
| 2009/0303706 A1 | 12/2009 | Atehortua | |
| 2010/0269409 A1 | 10/2010 | Johnson | |
| 2010/0276410 A1 | 11/2010 | Hudson et al. | |
| 2011/0157891 A1 | 6/2011 | Davis et al. | |
| 2011/0232190 A1 | 9/2011 | Pindus et al. | |
| 2011/0253056 A1 | 10/2011 | Fredricks | |
| 2012/0104977 A1 | 5/2012 | Mckenzie et al. | |
| 2012/0281413 A1* | 11/2012 | Lewis | A01G 9/249 362/249.11 |
| 2013/0107530 A1 | 5/2013 | Wyrick et al. | |
| 2013/0141914 A1* | 6/2013 | Lai | F21V 21/22 362/249.03 |
| 2013/0155685 A1 | 6/2013 | Stanley | |
| 2014/0069007 A1 | 3/2014 | Chen et al. | |
| 2014/0123554 A1 | 5/2014 | Chen et al. | |
| 2014/0208642 A1 | 7/2014 | Henman et al. | |
| 2014/0251227 A1 | 9/2014 | Wang | |
| 2014/0305376 A1 | 10/2014 | Lutz et al. | |
| 2014/0318006 A1 | 10/2014 | Sutherland et al. | |
| 2014/0318012 A1 | 10/2014 | Fujiyama | |
| 2014/0328006 A1 | 11/2014 | Mitlin et al. | |
| 2015/0313090 A1 | 11/2015 | Weiss et al. | |
| 2015/0313095 A1 | 11/2015 | Fenner, Jr. | |
| 2015/0319933 A1 | 11/2015 | Li | |
| 2016/0044875 A1 | 2/2016 | Nutter et al. | |
| 2016/0345513 A1 | 12/2016 | Lo et al. | |
| 2017/0055538 A1 | 3/2017 | Ohta et al. | |
| 2017/0066587 A1 | 3/2017 | Fenner, Jr. | |
| 2017/0094756 A1 | 3/2017 | Saffari | |
| 2017/0094914 A1 | 4/2017 | Paquette | |
| 2017/0188531 A1* | 7/2017 | Daniels | A01G 7/045 |
| 2018/0020623 A1 | 1/2018 | Lin et al. | |
| 2018/0160633 A1 | 6/2018 | Delao | |
| 2018/0255709 A1* | 9/2018 | Topps | A01G 9/249 |
| 2018/0359944 A1 | 12/2018 | Millar et al. | |
| 2019/0098843 A1 | 4/2019 | Rosen et al. | |
| 2019/0261576 A1 | 8/2019 | Vardi et al. | |
| 2019/0327908 A1 | 10/2019 | Goettle et al. | |
| 2019/0327910 A1 | 10/2019 | Montagano | |
| 2019/0327911 A1 | 10/2019 | Montagano | |
| 2019/0335675 A1* | 11/2019 | Ngo | F21V 23/007 |
| 2020/0041109 A1* | 2/2020 | Van Der Schyf | E05D 3/02 |
| 2020/0053854 A1 | 2/2020 | Xu et al. | |
| 2020/0063931 A1 | 2/2020 | Song et al. | |
| 2020/0170193 A1 | 6/2020 | Adams et al. | |
| 2020/0281129 A1* | 9/2020 | Anderson | A01G 9/0297 |
| 2020/0344965 A1* | 11/2020 | Song | A01G 7/00 |
| 2021/0137027 A1* | 5/2021 | Howe | A01G 9/16 |

FOREIGN PATENT DOCUMENTS

| | | | |
|---|---|---|---|
| CN | 101144581 | 3/2008 | |
| CN | 201897098 U | 7/2011 | |
| CN | 202050746 U | 11/2011 | |
| CN | 103270901 A | 9/2013 | |
| CN | 203757870 U | 8/2014 | |
| CN | 204104459 | 1/2015 | |
| CN | 206165261 U | 5/2017 | |
| CN | 206302819 | 7/2017 | |
| CN | 108812274 | 11/2018 | |
| DE | 3145484 | 5/1983 | |
| DE | 10129494 A1 * | 1/2003 | ............... A01G 9/26 |
| EP | 2727458 A1 | 5/2014 | |
| GB | 1307763 | 2/1973 | |
| JP | H03027219 | 2/1991 | |
| JP | H08315626 A | 11/1996 | |
| JP | H1094333 A | 4/1998 | |
| JP | H1094334 A | 4/1998 | |
| JP | H11266720 A | 10/1999 | |
| JP | 2010029098 | 2/2010 | |
| JP | 2014113145 A | 6/2014 | |
| JP | 2019062813 | 4/2019 | |
| KR | 20120060096 | 6/2012 | |
| KR | 101342141 B1 | 12/2013 | |
| KR | 20140001689 | 1/2014 | |
| TW | 201543995 | 12/2015 | |
| WO | 2007078235 | 7/2007 | |
| WO | 2011121845 A1 | 10/2011 | |
| WO | 2017047024 A1 | 3/2017 | |
| WO | 2018136876 | 7/2018 | |
| WO | WO-2018136755 A1 * | 7/2018 | ......... A01G 13/0237 |
| WO | 2018187117 | 10/2018 | |

OTHER PUBLICATIONS

Montagano, Michael; Non-Final Office Action for U.S. Appl. No. 16/181,692, filed Nov. 6, 2018, mailed Aug. 29, 2022, 12 pgs.

Montagano, Michael; Advisory Action for U.S. Appl. No. 16/181,692, filed Nov. 6, 2018, mailed Jun. 2, 2023, 4 pgs.

Montagano, Michael; Final Office Action for U.S. Appl. No. 16/181,692, filed Nov. 6, 2018, mailed Mar. 13, 2023, 11 pgs.

Montagano, Michael; First Office Action for Chinese Application No. 202080056170.5, filed Aug. 6, 2020, mailed Feb. 14, 2023, 24 pages.

Montagano, Michael; Search Report for Chinese Application No. 202080056170.5, filed Aug. 6, 2020, mailed Feb. 13, 2023, 6 pages.

Montagano, Michael; Notice of Allowance for U.S. Appl. No. 16/181,692, filed Nov. 6, 2018, mailed Oct. 3, 2023, 8 pgs.

Montagano, Michael; Extended European Search Report for Application No. 20849047.4, filed Aug. 6, 2020, mailed Jul. 13, 2023, 14 pgs.

Montagano, Michael; Korean Office Action for Korean Application No. 10-2018-0154573 issued Feb. 27, 2020; 32 pages.

Heliospectra; Article entitled: "Intelligent Lighting Solutions for Optimal Plant Growth and Energy Efficiency", Jan. 2016, 72 pgs.

Invictus MD; Article entitled: "Future Harvest Patents NanoDome", dated Jun. 8, 2015, 4 pgs.

Lumileds; Article entitled: "Luxeon Sunplus Series Lime LEDs Produce High Yield and Nutrition in Leafy Greens", 2017, 8 pages.

Mondi Products Ltd.; Examination Report for UK Patent application No. GB1819207.0, mailed May 17, 2019, 6 pgs.

Montagano, Michael; First Office Action for Chinese Application No. 201811392287.1, filed Nov. 21, 2018, mailed Feb. 9, 2021, 23 pages.

Montagano, Michael; Non-Final Office Action for U.S. Appl. No. 15/994,443, filed May 31, 2018, mailed Feb. 19, 2021, 35 pgs.

Montagano, Michael; Notice of Allowance for U.S. Appl. No. 15/994,443, filed May 31, 2018, mailed Jun. 28, 2021, 13 pgs.

Montagano, Michael; Requirement for Restriction/Election U.S. Appl. No. 15/994,443, filed May 31, 2018, mailed Aug. 11, 2020, 5 pgs.

Montagano, Michael; Supplemental Notice of Allowance for U.S. Appl. No. 15/994,443, filed May 31, 2018, mailed Oct. 12, 2021, 6 pgs.

(56) References Cited

OTHER PUBLICATIONS

Thrive Agritech; Article entitled: "Products That Deliver: Lighting with unsurpassed performance", dated Dec. 20, 2017, 41 pgs.

Montagano, Michael; Final Office Action for U.S. Appl. No. 16/181,692, filed Nov. 6, 2018, mailed Jan. 28, 22, 13 pgs.

Montagano, Michael; Japanese Office Action for Japanese Application No. 2018-227490 issued Feb. 12, 2020; 8 pages.

Montagano, Michael; Non-Final Office Action for U.S. Appl. No. 16/181,692, filed Nov. 6, 2018, mailed Sep. 27, 2021, 48 pgs.

Montagano, Michael; Requirement for Restriction/Election for U.S. Appl. No. 16/181,692, filed Nov. 6, 2018, mailed Jun. 14, 2021, 5 pgs.

Mearbert's Brute; Website entitled: "Space Buckets", Jun. 13, 2017, retrieved from <https://web.archive.org/web/20170613103331/https://www.spacebuckets.com/u/Mearbert>.

Montagano, Michael; International Search Report and Written Opinion for PCT/CA2020/051073, filed Aug. 6, 2020, mailed Nov. 13, 2020, 12 pgs.

Montagano, Michael; Issue Notification for U.S. Appl. No. 16/181,692, filed Nov. 6, 2018, mailed Feb. 7, 2024, 2 pgs.

Montagano, Michael; Examiner Requisition for Canada Patent Application No. 3144729, filed Aug. 6, 2020, mailed Jan. 24, 2024, 10 pgs.

Montagano, Michael; Notice of Reasons for Refusal for Japanese Application No. 2022-507701, filed Aug. 6, 2020, mailed Jul. 16, 2024, 10 pages.

Montagano, Michael; Office Action for Republic of Korea Patent Application No. 10-2022-7007870, filed Aug. 6, 2020, mailed May 20, 2025, 24 pgs.

* cited by examiner

PLANT ENCLOSURE WITH VERTICALLY DISTRIBUTED LIGHT SOURCES

CROSS-REFERENCE TO RELATED APPLICATIONS

This application claims the priority or benefit of U.S. provisional patent application 62/884,468, filed Aug. 8, 2020, the specification of which is hereby incorporated herein by reference in its entirety.

BACKGROUND

(a) Field

The subject matter disclosed generally relates to gardening or small-scale agriculture devices. More specifically, it relates to a system for covering and/or growing a plant therein.

(b) Related Prior Art

A successful indoor/outdoor cultivation requires an environment having the right combination of illumination, including light intensity and color or spectrum, and temperature and humidity levels. Some crops are more sensitive than others with respect to the levels and variations (increase/decrease) of temperature, humidity, and light intensity and changes in light spectrum. These factors affect the production yield and the concentration of nutrients and antioxidants in the crops.

As part of their normal growing need, some crops/plants require a higher light intensity in their early growing stages than in the following stages, in order to fuel the active growth. Others require longer hours of light for a better growth and development (mainly those planted in area that do not receive sufficient hours of sunshine/light). Other plants require light having specific wavelengths and/or color. Some plants require to be covered in the winter to protect their leaves from harsh weather conditions and cold/dry air. Some others, require a source of light during transportation to not exceed a certain amount of hours without light which would result in yellowing and other problems.

Traditional illuminations domes on the market are for indoor use and comprise lighting at the top thereof. However, as the plant grows, upper leaves grow in size and number, and lower leaves start lacking necessary light, and start yellowing and decreasing in number and yield. Therefore, the existing domes do not adapt very well to the varying needs of the growing plant.

A need exists in the market for an alternative solution that addresses the above-mentioned shortcomings. Moreover, the plant may suffer from the lack of lighting in the winter time, especially if the plant being grown is typical of more tropical environment where illumination is more or less constant over the year. When such a plant is grown as an indoor or outdoor plant in temperate climates, there is a more significant variation of natural lighting over the year, i.e., more lighting in the summer time, where the plant grows more intensely, and less lighting in the winter time, where the grown leaves get yellow, or fade or fall down.

There is therefore a need in the market for a dome/cage that addresses the above requirements.

SUMMARY

The present embodiments describe a multi-purpose system that address these issues simultaneously.

To address these issues simultaneously, a system for lighting a plant is now described. According to a first embodiment, there is described a dome forming an enclosure that surrounds and covers the plant; and a plurality of light sources supported by the dome, the plurality of light sources being distributed vertically from a bottom of the dome to a top of the dome and around the dome, i.e., individually positioned at different heights (i.e., distributed vertically) and at different sides (i.e., distributed horizontally too), to evenly illuminate the plant from different sides and at various heights and portions thereof.

In accordance with an alternative embodiment, there is described a system for lighting a plant comprising: a cage comprising arms, the arms being rigid an self-supporting, forming the cage that surrounds and extends over the plant; and a plurality of light sources supported by the arms of the cage, the light sources being distributed vertically from a bottom of the cage to a top of the cage and around the cage to illuminate an inside of the cage at various heights (on each arm) and sides (corresponding to different arms) to evenly illuminate a plant growing within the cage.

In the present document, the term dome refers to any one of the following: mini-greenhouse, greenhouse, indoor cultivator, cultivator, growing device or any apparatus used for growing plants therein.

It should be noted that the term "dome" is the term known in the art for such covers and that this term is not limited to circular shapes (as the typical geometrical definition may imply). As used in the art, and as intended in the present document, the term "dome" refers to an enclosure having a base which may be rectangular, square, triangular, circular, oval, or any other regular polygon or irregular geometrical shape. Furthermore, the terms dome designates the portion that fits on the plant pot or other form of support in some embodiments, or straight on the soil in other embodiments, to define and close the enclosed environment, or inside or inner volume, within which the plants grow and receive light. This is usually made of a transparent material for allowing ambient light therein. A cage may define the same inside or inner volume, while not closing it as the cage does not have closed surfaces. In alternative embodiments, the cage may be adapted to receive thereon (on top of the cage) or therein (underneath the cage) a dome to define a closed environment for growing the plant therein.

According to one aspect, there is provided a method for lighting a plant comprising: providing a dome or cage defining an inner volume that surrounds and covers the plant; providing a plurality of light sources supported by the plant; providing a plurality of light sources supported by the dome or cage, the light sources being distributed vertically from a bottom of the dome or cage to a top of the dome or cage and around the dome or cage to surround the plant with light from bottom to top; and controlling the light sources to perform one or more of: projecting light in the dark, extending ambient light hours, increasing an intensity of an existing ambient light; and modifying a spectrum of the existing ambient light in accordance with growth requirements specific to a given plant growing in a specific environment.

In one embodiment, the method further comprises providing a solar panel on the dome or cage; providing the light sources with electric energy generated by the solar panel either directly or through a battery operably connected to the solar panel for storing the electric energy received from the solar panel; and operating the dome or cage as a standalone unit independently of external energy sources.

The method may further comprise receiving a user input setting a lighting program; and controlling the light sources in accordance with the set program.

According to another aspect, there is provided a system for lighting a plant comprising: a dome forming an enclosure that surrounds and covers the plant; and a plurality of light sources being supported by the dome, the light sources being distributed vertically from a bottom of the dome to a top of the dome and around the dome to illuminate an inside of the dome, wherein the system is adapted to control the light sources to perform one or more of: projecting light in the dark, extending ambient light hours, increasing an intensity of an existing ambient light; and modifying a spectrum of the existing ambient light in accordance with growth requirements specific to a given plant growing in a specific environment. The system being used to surround the plant with light from bottom to top during transportation, storage and normal growth in the specific environment, while protecting the plant from animals, insects and harsh weather conditions.

The system may further comprise a solar panel operably connected to the light sources either directly or through a battery for operating the system as a standalone unit independently of external energy sources.

A control unit may be provided which is adapted to receive a user input setting a lighting program, the system being adapted to control operation of the lights using the set program.

In one embodiment, the dome comprises a top dome surface above the plant and a lateral dome surface extending around the plant, a portion of the light sources being supported by the top dome surface and a remainder of the light sources being supported by the lateral dome surface.

The system may further comprise a fan at a top of the dome for evacuating air upwardly.

In one embodiment, the top surface of the dome is a lid installed above the fan.

In another embodiment, the top surface is a lid and the fan is installed thereon.

The system may further comprise a filter which is installed above the fan for filtering particles evacuated from the system.

In an embodiment, the top dome surface and the lateral dome surface comprise perforations, distributed vertically from the bottom of the dome to the top of the dome and around the dome, in which the light sources can be mounted by being inserted from the outside to illuminate the inside of the dome. In the present embodiment the illuminating sources may be light-emitting diodes having an illumination portion and an electronic portion, the illumination portion being directed toward an inside volume of the enclosure and the electronic portion remaining on the system, out of the enclosure.

In an embodiment, the dome is made of a translucent material that allows ambient light to penetrate the dome.

In another embodiment, the dome is made of an opaque material that does not allow ambient light into the dome.

The dome may include a reflective layer on an inside surface thereof to reflect and recycle the light generated by the light sources.

In an embodiment, the system further comprises an extension dimensioned to operably connect to the dome for extending the height of the enclosure defined by dome, the extension comprising light sources distributed vertically from a bottom of the extension to a top of the extension and around the extension and being electrically connected to the dome so that operation of the light sources of the extension follow the operation of the light sources of the dome.

In accordance with another aspect, there is provided a system for lighting a plant comprising: a cage comprising self-supporting arms forming the cage that surrounds and extends over the plant; and a plurality of light sources supported by the arms of the cage, the light sources being distributed vertically from a bottom of the cage to a top of the cage and around the cage to illuminate an inside of the cage; wherein the system is adapted to control the light sources to perform one or more of: projecting light in the dark, extending ambient light hours, increasing an intensity of an existing ambient light; and modifying a spectrum of the existing ambient light in accordance with growth requirements specific to a given plant growing in a specific environment. The system being used to surround the plant with light from bottom to top during transportation, storage and normal growth in the specific environment.

The system may further comprise a solar panel operably connected to the light sources either directly or through a battery for operating the system as a standalone unit independently of external energy sources.

A control unit may be provided which is adapted to receive a user input setting a lighting program, the system being adapted to control operation of the lights using the set program.

In one embodiment, the system may further comprise an extension dimensioned to operably connect to the cage for extending the height of the cage, the extension comprising light sources distributed vertically from a bottom of the extension to a top of the extension and around the extension and being electrically connected to the cage so that operation of the light sources of the extension follow the operation of the light sources of the cage.

In another embodiment, the length of the arms of the cage is adjustable in a telescoping manner to extend the height of the cage to accommodate for the plant's growth.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The embodiments describe a method and system for lighting a plant. The system comprising a dome/cage defining a volume that receives, surrounds and/or covers the plant. A plurality of light sources are supported by the dome/cage and distributed vertically from a bottom to a top of the dome/cage and around the dome/cage to illuminate the inside more evenly over space and over time during low-illumination periods. The system is adapted to control the light sources to perform one or more of: project light in the dark, extend ambient light hours, increase an intensity of an existing ambient light; modify a spectrum of the existing ambient light in accordance with growth requirements specific to a given plant growing in a specific environment. A solar panel may be operably connected to the light sources either directly or through a battery for operating the system as a standalone unit independently of external energy sources. A control unit may be provided to receive a user input setting a lighting program, to allow the system to control operation of the lights using the set program.

Figure 1:
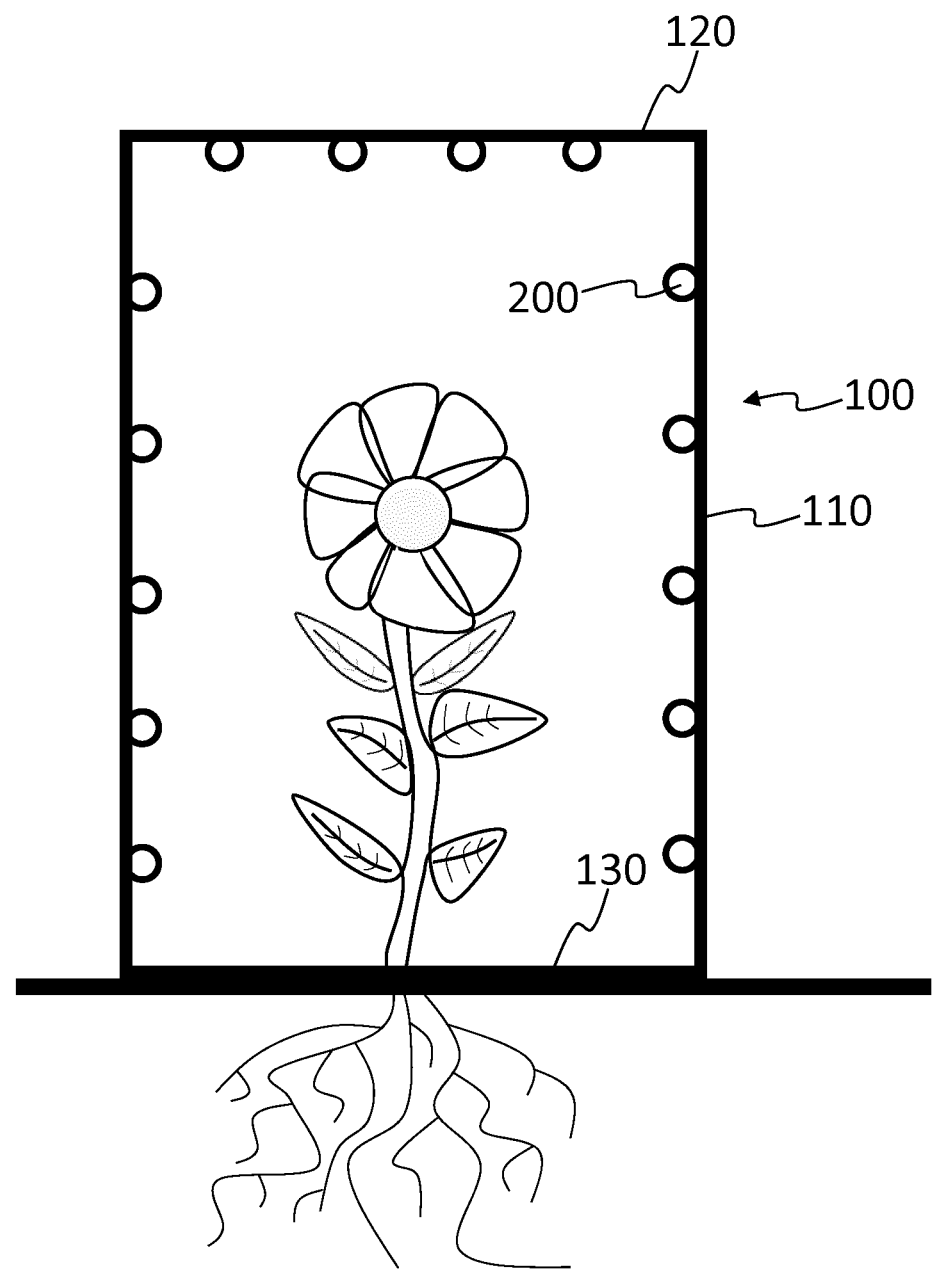
FIG. 1 is a cross section illustrating a dome standing on the ground for growing a plant, according to an embodiment of the invention.
Figure 2:
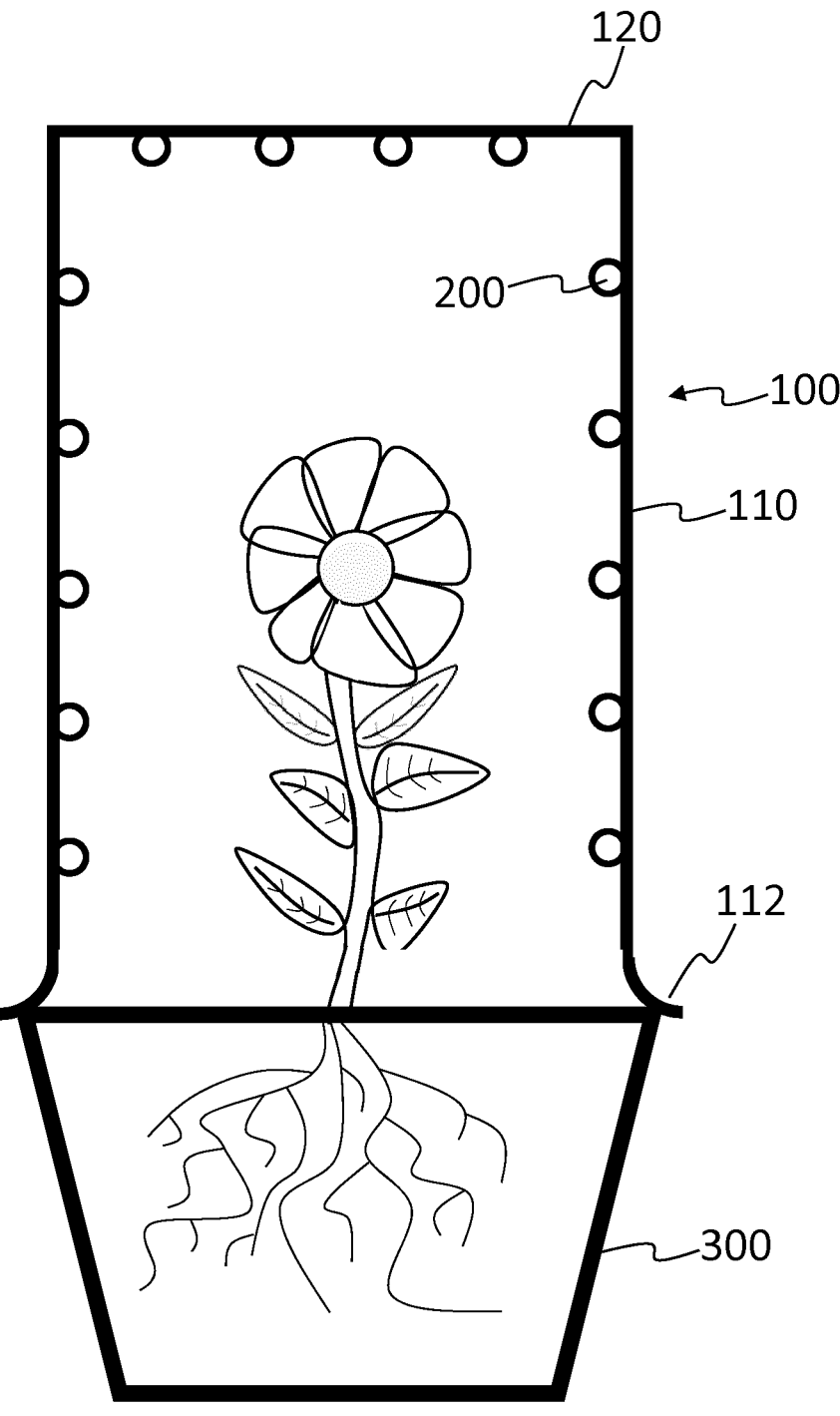
FIG. 2 is a cross section illustrating a dome standing on a pot for growing a plant, according to an embodiment of the invention.

Now referring to FIGS. 1 and 2, there is described a dome 100 which for installing over and around a plant to ensure proper lighting as the plant grows, either standing on the ground directly or on a plant pot. To ensure that the plant receive sufficient illumination as it grows, the dome 100 comprises light sources 200 which are not only located above the plant (as in the prior art), but also all around the sides of the plant to ensure that lower leaves still receive sufficient lighting even though the upper leaves grow in size and number. By providing additional light sources 200 down to the level of the lower leaves of the plant, immediately above the ground, the plant can sustain a significant growing rate even if the plant keeps growing and the lower leaves do not lack proper lighting. The fact that the upper leaves can block light coming from above is not a problem anymore since there are additional light sources 200 which have a more suitable location for the lower leaves, in comparison with a typical dome that would only have lighting at the top, using the various sides of the dome 100 which provide additional attachment points for the light sources 200 being distributed around the plant, and also making use of the attachment points being available for securing the light sources 200 at different heights for each of the different sides of the dome 100. There is therefore both a vertical distribution and an azimuthal distribution of the light sources 200 around a central vertical axis where the plant is expected to grow.

The dome should therefore provide physical support to the light sources 200 (for securing them thereonto and maintaining the position in relation with the volume where the plant grows) to ensure that they are spatially distributed along the height of the plant, from top to bottom, and also around the plant. The support by the dome should be provided by the dome surfaces and/or by the structure forming the dome, as described more thoroughly further below.

In a non-limiting example of implementation, the dome 100 can have openings on its surface, and the light sources 200 are shaped and dimensioned to either project light through the openings of the dome by positioning them right outside the dome facing the openings, or to be partially received within corresponding openings on the dome to project the light from within the dome while keeping the heat generating components of the light source outside the dome for releasing the heat generated in the environment surrounding the growing device.

According to an embodiment, the dome 100 may be made using a transparent or translucent material to allow most of the light to reach the inside volume in which the plant grows, and in this case, may be made from a suitable plastic material, or tempered glass, or any combination thereof. The dome 100 may also have color if the light is projected from the inside of if it is projected therein using cutouts/openings. More generally, the dome 100 may be transparent, translucent, or opaque, and may be made from a suitable plastic material, a glass material, wood, a metal or any combination thereof to provide additional structural strength. The surfaces forming the inside of the dome 100 may even comprise a reflecting coating such as to form inner mirrors that reflect light inside the dome instead of absorbing it, thus ensuring that the light emitted by the light sources is maximally absorbed by the leaves, to increase production yield, and not by the dome material (which would further cause undesirable heating).

The dome 100 may be completely rigid, for example formed of a single plastic object molded as a single piece, or formed of rigid panels attached, welded, nailed or otherwise attached or secured together. Alternatively, the dome 100 may comprise a rigid structure made of rigid arms forming a frame on which panels are mounted for enclosing the inside volume in which the plant is expected to grow. In this case, the panels may be rigid (and thus mounted on the structure) or flexible (such as a fabric or canvas). The dome 100 being an enclosure, protects the plan from external aggressions, such as animals (squirrels, birds, insects, etc.).

The light sources 200 can be provided as LEDs, or halogen lamps, or incandescent lamps, for example, having an emission spectrum which is appropriate for the plant growing inside the dome 100. According to an embodiment, the dome 100 comprises dedicated fastening members for attaching each one of the light sources 200 thereto. According to another embodiment, the lights sources 200 can be screwed, nailed, pinned, sewn or adhesively bonded to the dome 100 (i.e., to the surfaces thereof), or to a structure of the dome if the dome is formed of rigid arms and flexible surfaces.

As shown in FIG. 1, the enclosure or dome 100 comprises a top dome surface 120 and a lateral dome surface 110. The lateral dome surface 110 can have a curvature and be, for example, circular when viewed from the top. In this case, the lateral dome surface 110 would be a cylinder that surrounds the plant. Otherwise, the lateral dome surface 110 can be polygonal when viewed from the top (or in the cross section), and the lateral dome surface 110 would then be a prism that surrounds the plant. Alternatively, the dome can have a bell shape. The dome 100 should be closed on the top in that it comprises a top dome surface 120.

According to an embodiment, the top dome surface 120 is removable or hingeable, or a portion thereof is removable or openable, to act as a vent. Other openings or cutouts may be provided to form other vents. Moreover, having the top dome surface 120 removable provides the possibility to install a fan 410 onto the opening that is left when removing it, as explained further below.

According to an embodiment, the dome 100 does not have a bottom surface, so that the dome 100 is open to the bottom. However, the lateral dome surface 120 ends at the bottom with an edge 130 that has the circular or polygonal shape, for example, and that contacts the ground when the dome 100 stands on the ground around and over the plant. The edge 130 may comprises legs or pegs which stand onto the ground.

Now referring to FIG. 2, there is shown that the dome 100 can also be standing over a pot 300 or other type of container for a plant e.g. tray including a growing medium. The dome 100 is therefore usable on any pot of suitable dimensions and it encloses the volume which is located above the pot in which the plant, growing from the pot, is expected to extend. In order to help accommodating to a variety of pot diameters and dimensions, the lateral dome surface 110 may end at its bottom with a skirt 112. The skirt 112 comprises a member which extends laterally, such as extending laterally (but could extend inwardly in addition or in replacement of the outward extension). Having the skirt 112 extend at least in the horizontal plane aids in having the dome 100 adapt to various pot diameters and entering in contact with the pot upper edge when the dome stands thereon. Otherwise, there may be provided pegs which stand onto the pot 300. The dome 100 may be adapted to be releasably secured to the pot 300 using a suitable locking mechanism. For example, the dome may be releasably screwed onto the pot 300 or vice versa, or may be clipped onto it using clips, or snap connectors, etc., which could be provided at the bottom end of the dome 100 (i.e., under the skirt 112 or on the pegs provided at the bottom). In an embodiment, the system may include the dome/cage and the container to which the dome/cage connect and which includes the soil and the plant. This application is typically used for growing plants indoor, for transportation etc.

Figure 3:
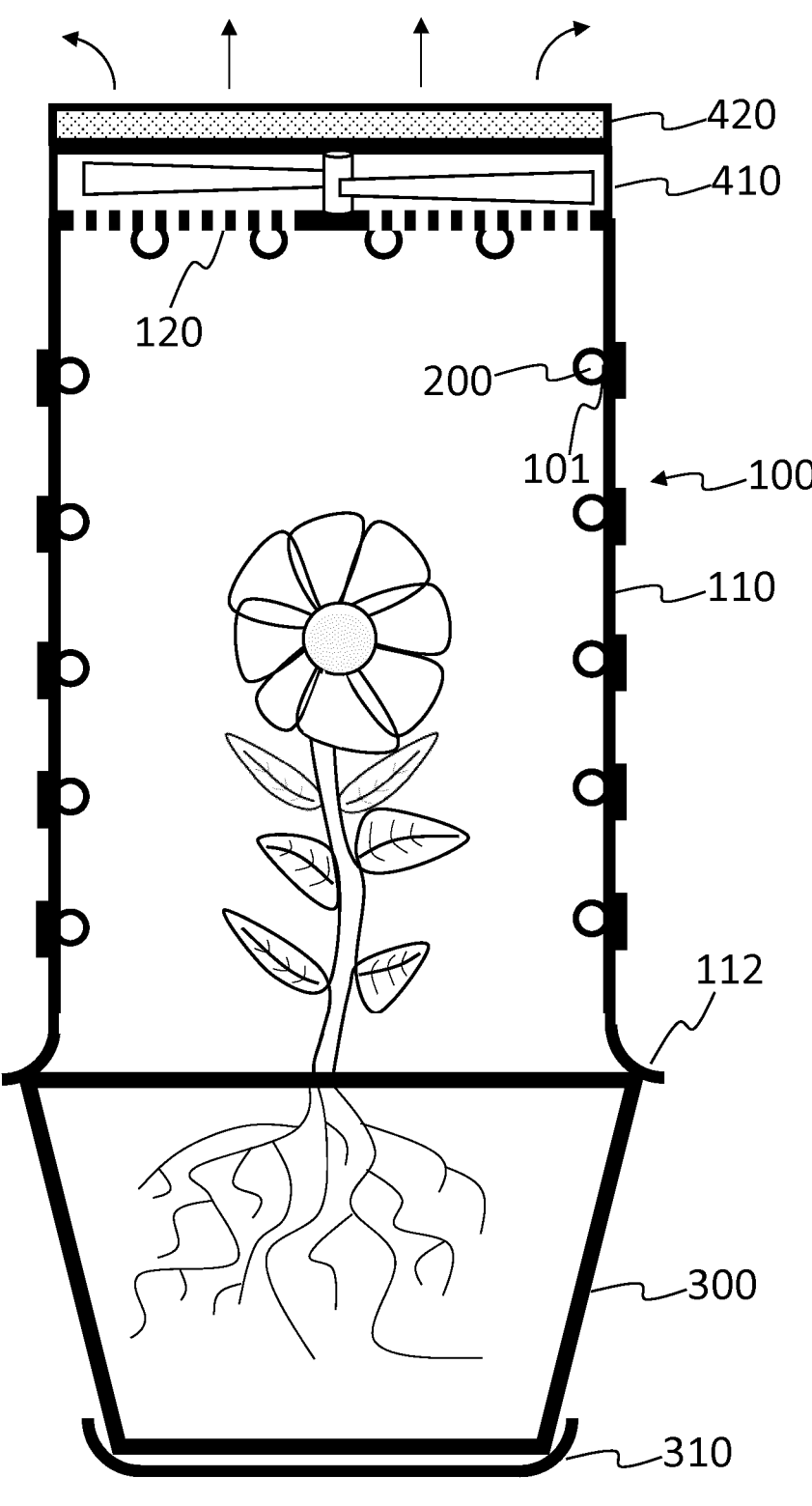
FIG. 3 is a cross section illustrating a dome standing on a pot for growing a plant, according to another embodiment of the invention.

Now referring to FIG. 3, there are shown various features which are shown only in FIG. 3, but are independent one from the other.

According to an embodiment, there is provided a fan 410 onto the dome 100. The fan 410 can be used to maintain a stable or adequate temperature in the dome 100 for optimal growth of the plant, by having the fan 410 preferentially evacuate the warmer air that reaches the top of the dome 100 and would otherwise accumulate there.

If a fan 410 is used, the top surface 120 should at least comprise perforations or any other type of opening to allow the air to be drawn up by the fan 410. It can be provided below the fan 410, as shown in FIG. 3, implying that that fan 410 is installed by being fitted onto the top surface 120, onto which it can be secured (using a clip, a snap connector, etc.). Preferably, the top surface 120 should be removable (e.g., a removable lid) so that the fan 410 can be positioned there instead of the top surface 120. The top surface of the fan element should also be perforated or widely open to allow the upward evacuation of warm air, and/or comprise a filter, as described below.

Indeed, if a fan 410 is used, some particles, such as dust from the soil or particles produced by the plant itself, can be propelled by the fan 410 away to the surroundings. To avoid this situation, a filter 420 can be installed, e.g., at the output of the fan 410 (as shown in FIG. 3) or between the fan 410 and the top dome surface 120 if this it is still present as a perforated lid onto the fan 410. The filter 420 can therefore capture the dust or other particles.

According to an embodiment, the pot 300 can be a self-watering pot, which is useful given that the plant and its immediate surrounding is covered by the dome and hence hardly accessible for watering without temporarily removing the dome 100. A saucer 310 is shown as an example of a device that can contain excess water and contribute to the self-watering feature of the pot 300.

According to an embodiment, the light sources 200 can be installed inside the surfaces forming the dome 100.

According to another embodiment, and still referring to FIG. 3, the dome 100 comprises apertures 101 (or openings or perforations) at dedicated locations such that the light sources 200 can be fitted within the dedicated apertures 101. In this case, the light sources have their illuminating end within the aperture 101 which can even protrude inside the dome 100, whereas the supporting electronics of the light source is rather located outside the dome 100, as shown in FIG. 3. In other words, in this embodiment, the illuminating sources 200 are light-emitting diodes having an illumination portion and an electronic portion, the illumination portion being directed toward an inside volume of the enclosure and the electronic portion remaining on the system, out of the enclosure. This is advantageous in that the surfaces (110, 120) forming the dome 100 have no requirement regarding transparency. Moreover, if the light sources are LEDs, the illuminating portion, located inside the dome 100, does not produce significant heat and does not affect the temperature inside the dome, whereas the supporting electronics, which produces significant heat, is located outside the dome 100, thereby not affecting the temperature inside the dome. This embodiment mitigates heat generation inside the dome 100. Advantageously, the dedicated apertures 101 can be located, for example, at regular intervals around the lateral surface 110, in which case the light sources 200 can be provided on a strip 230 which can be installed by stretching it on the contour of the dome, thus installing a plurality of light sources 200 simultaneously on a single stage of light sources 200 all around the dome 100.

In a less preferred embodiment, the light sources 200 can be installed on the outside of the surfaces forming the dome 100, in which case the surfaces (110, 120) forming the dome should be transparent, either as a whole or at least for the portions on which the light sources 200 are installed, such that the light emitted therefrom reaches the inside of the dome 100 to illuminate the plant.

Figure 4:
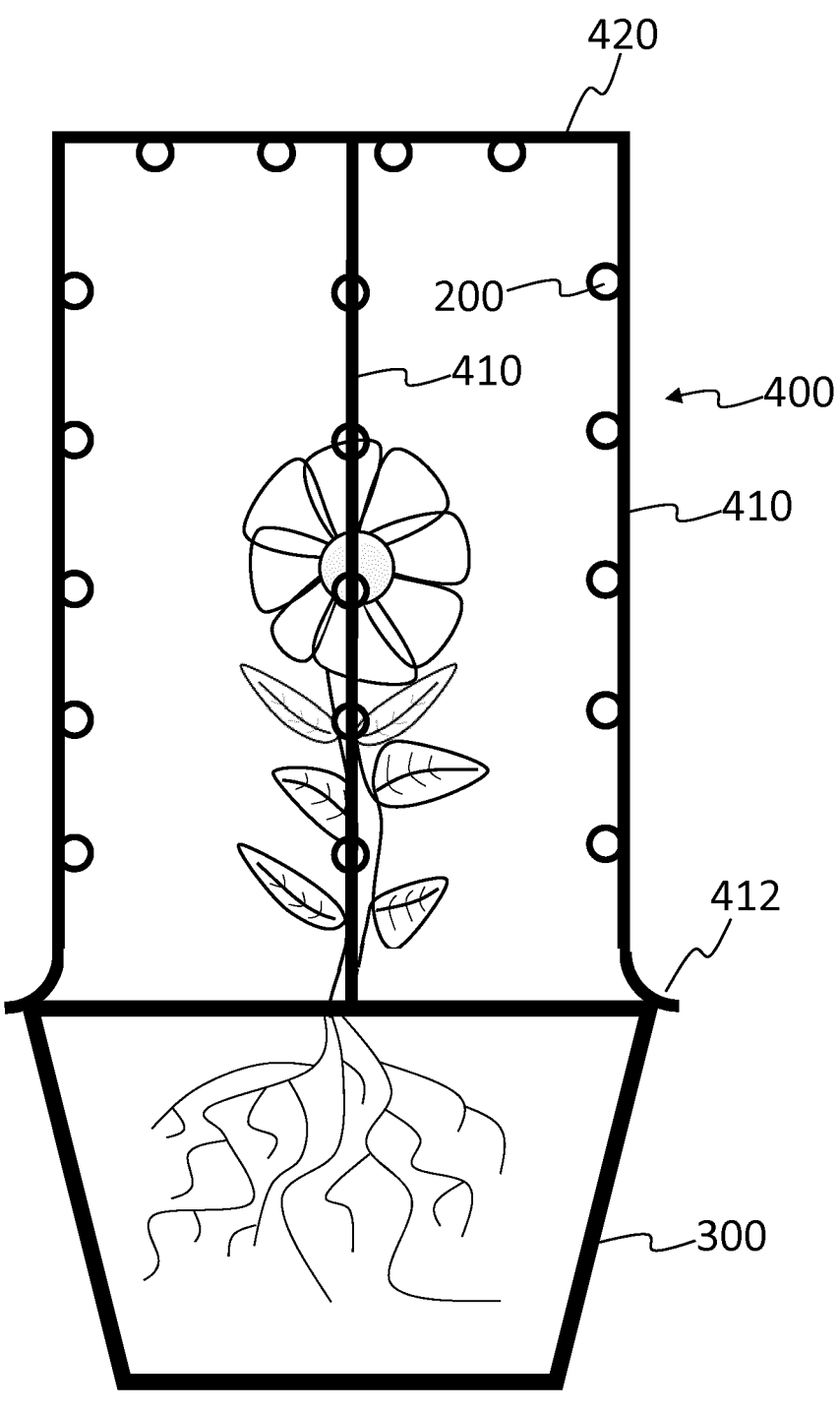
FIG. 4 is a side view illustrating a cage for growing a plant, according to an embodiment of the invention.
Figure 5:
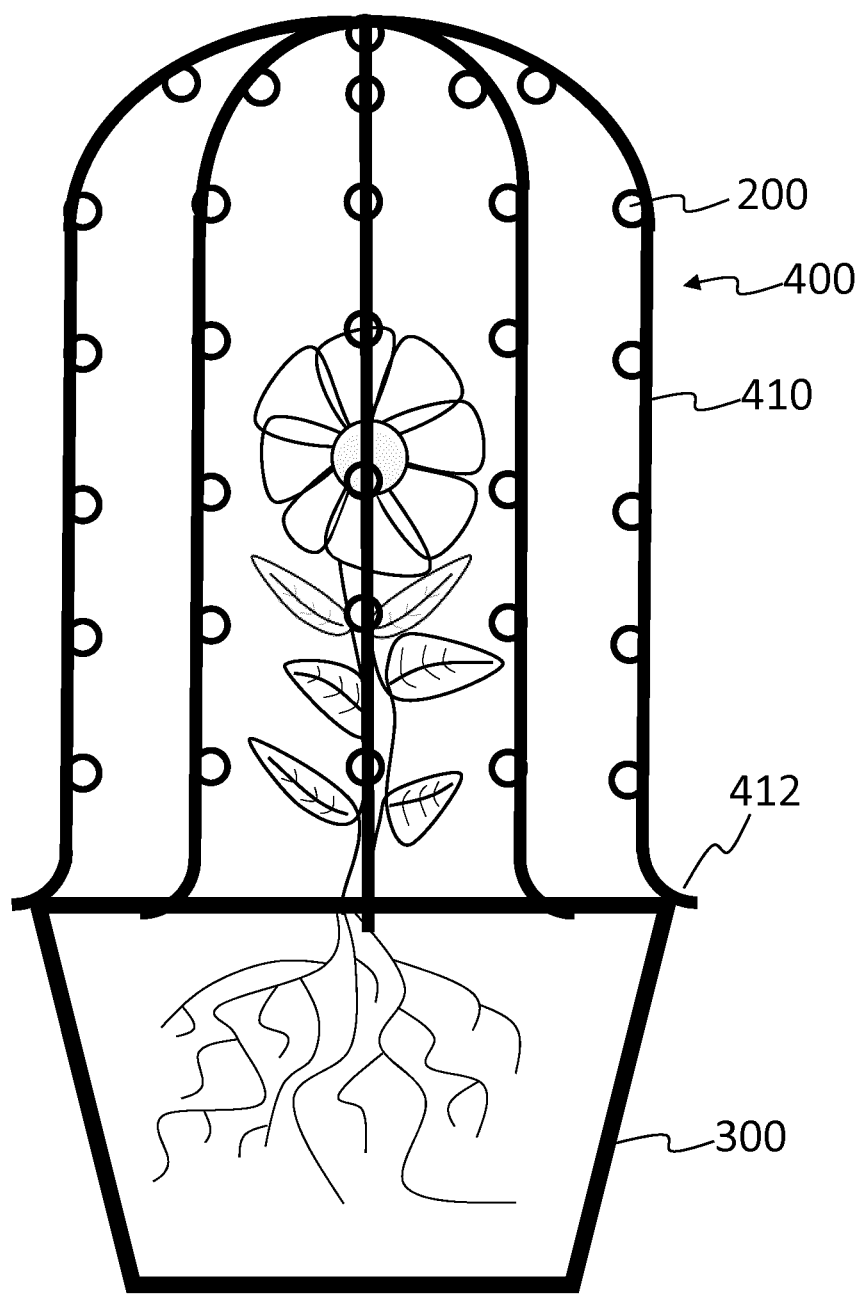
FIG. 5 is a side view illustrating a cage for growing a plant, according to another embodiment of the invention.

Now referring to FIGS. 4-5, there is described another embodiment in which the dome 100 is replaced by a cage 400. The cage 400 differs from the dome in that it is not a closed surface, i.e., it does not have surfaces that make up an enclosure, thereby offering instead only a skeleton onto which the light sources are mounted. The skeleton still defines an inside volume for growing the plant, without enclosing it with closed surfaces. The cage 400 differs from the dome 100 in that it is not a closed volume, but it can still provide a support for additional lighting when natural lighting from the environment outside the cage 400 is not sufficient for the plant, for example in winter time or when the plant is in the shade.

The cage 400 comprises lateral members 410 and top members 420 which make up a cage, without surfaces between them. The members (410, 420) can be viewed as arms or bars and are preferably rigid to be self-supporting. The cage 400 can be a rectangular prism or a cylinder (both can be inferred from the side view of FIG. 4), or have a bell shape by curving the lateral members 410 such that they join at the top (FIG. 5, thereby not being distinct from the top members 420, as a single member has a curvature which makes it rather horizontal on a portion thereof and rather vertical on another portion thereof). The light sources are mounted on to the members 410, 420 and provide a functionality similar to the embodiments of FIGS. 1-3. Fasteners can be provided on the members 410, 420 to install the light sources 200.

According to an embodiment, the bottom portion of the lateral members 410 can end with a base portion 412 which has a horizontal component (i.e., it extends at least partially horizontally, in a manner similar to the skirt 112) so that the cage 400 can stand on a pot of an unknown diameter, within the range allowed by the horizontal extension of the base portion 412 which would lie onto the upper edge of the pot 300 when being installed thereonto.

If there is a need to close the cage 400 to form an enclosure, a cover (e.g., made of fabric, plastic fabric, panels, etc.) can be installed either onto the cage or underneath its members 410, 420. Fastenings members should be provided to ensure that the cover holds to the cage 400. This can prevent overexposure to the sun or prevent insects from reaching the plant. If there is a cover over the cage 400, a vent can be provided, for example by having an opening on the top.

Figure 6:
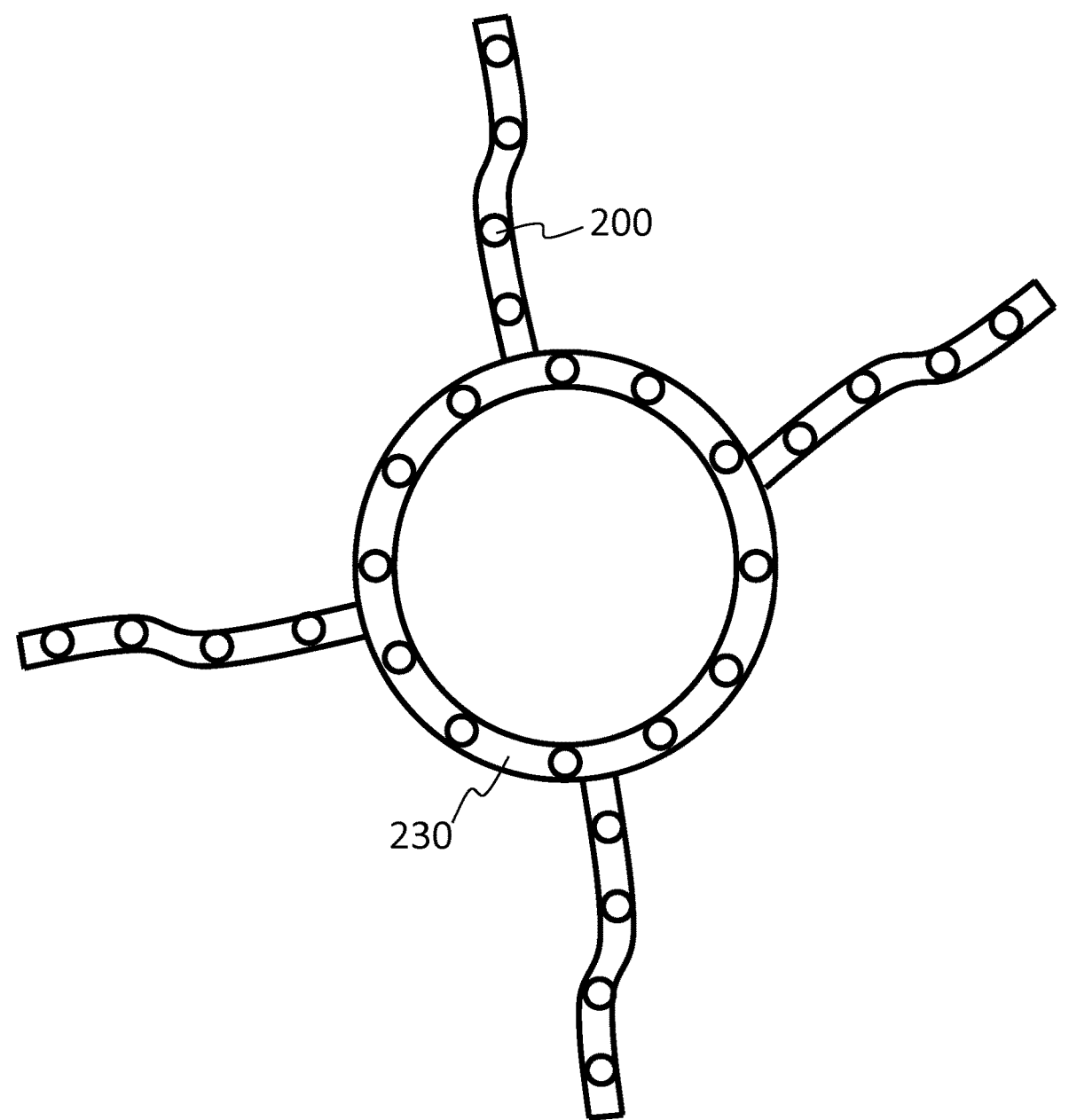
FIG. 6 is a side view illustrating a strip comprising light sources, the strip comprising a ring and elongated portions, according to an exemplary embodiment of the invention.
Figure 7:
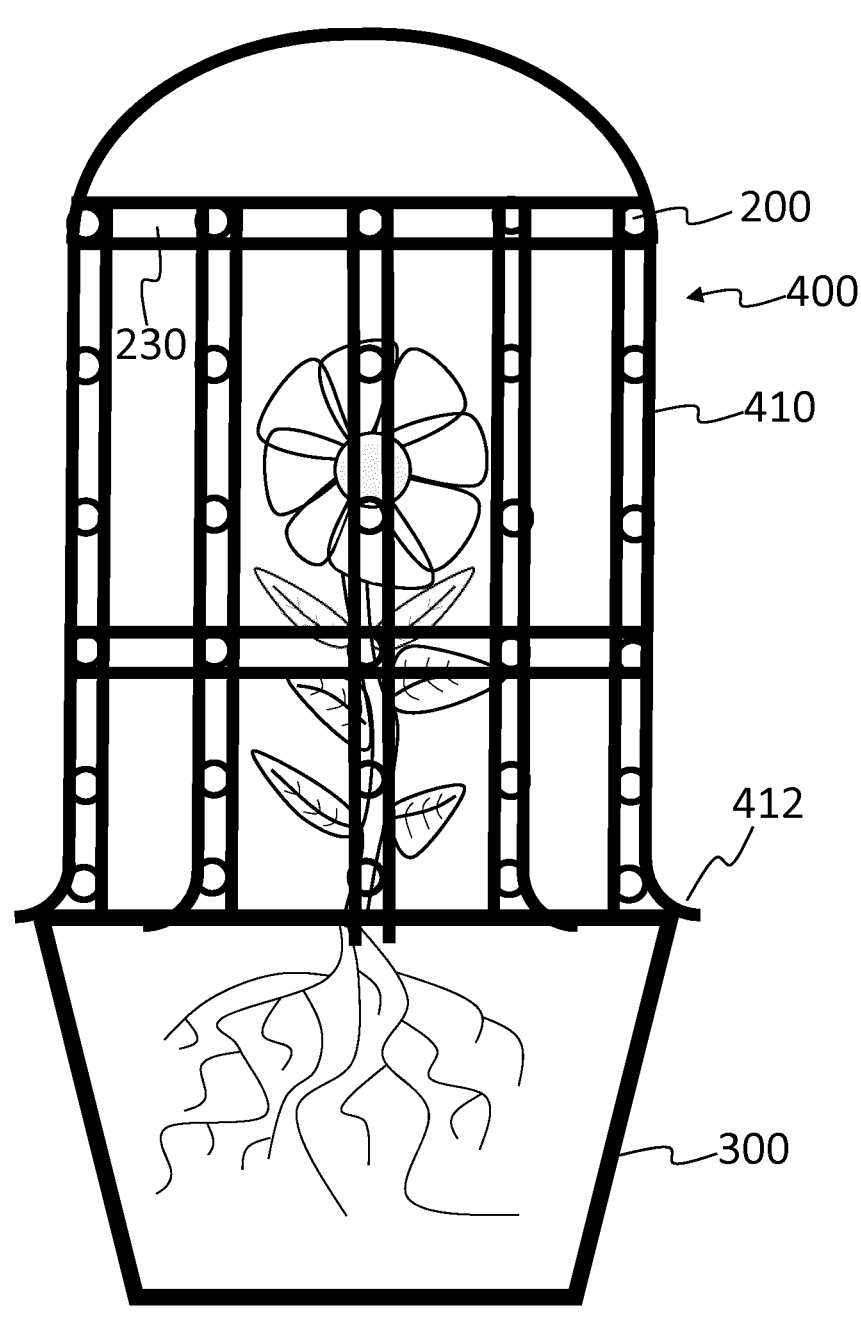
FIG. 7 is a side view illustrating a cage for growing a plant with strips comprising light sources installed thereon, according to an embodiment of the invention.

According to an embodiment, and as shown in FIGS. 6-7, the light sources 200 can be provided on a strip 230 which can have a shape of a ring and comprise elongated portions, for example. The strip 230, with its light sources 200, can then be installed onto the cage 400. More precisely, the ring shape can be installed by being secured at various anchoring locations onto the cage 400 (or onto the dome 100) so that the ring forms a stage, and the elongated portions extend downwardly along the lateral members 410 (or along the structure supporting the lateral surfaces 110 of the dome). FIG. 6 shows the ring-shaped strip having elongated portions, and FIG. 7 shows a cage onto which two of these strips have been installed, or a strip 230 comprising two rings of suitable diameter to fit the cage 400 (i.e., substantially the same diameter).

Each of the arms comprise a vertical portion which extends vertically, and may be curved at an upper portion thereof to extend at least partly horizontally (horizontal portion). An intermediate portion where the arm is curved between the vertical and the horizontal can be defined. The strip 230 comprises elongated members which match the arms of the cage, and can be releasably attached or secured thereto (e.g., using a Velcro™ hook-and-loop type of attachment, or snap connectors, or a zipper, or buttons). According to an embodiment, each of the elongated members of the strip matches the vertical portion of a corresponding one of the arms of the cage. The strip 230 further comprises a ring from which the elongated members extend, the ring being installed circumferentially around the cage about all of the arms. For example, the ring can lay onto the intermediate portion of each of the arms between the vertical portion and the horizontal portion, with the elongated members extending downwardly, each on the vertical portion of a corresponding arm.

According to another embodiment, the strips 230 can be the light sources 200, for example by making the strips with a light-diffusing material and by projecting the light from within.

The strips 230 can have any other shape which is consistent with the shape of the dome 100 or of the cage 400, which can be of any shape that is suitable to enclose a plant, including, without limitation, a cylinder, prism, cone, pyramid, or any other regular or irregular three-dimensional shape that can reasonably surround the plant. For example, the cage 400 may be provided as a rectangular box or a cylinder (FIG. 4 is a side view which applied to both shapes), and the strips 230 may be provided as bars or any combination of linear strips that fits onto such a structure.

According to an embodiment, the light sources 200 can be modulated in various respects. For example, the light sources 200 can have their emission spectrum modulated over time. This may be advantageous to adapt the emitted wavelength to the requirements of the plant, which vary over the plant's growing time. Accordingly, the emission spectrum can be optimized for each period of growth, and can even be modulated to emit different wavelengths toward different parts of the plant if this can be advantageous.

Similarly, the intensity of each the light sources can be modulated according to the plant's growth stage, according to the part of the plant being illuminated, and according to the base illumination coming from the environment (i.e., taking into account daylight to adapt the illumination produced from the light sources 200). Indeed, daylight can reach the plant if the dome 100 is transparent or translucent, or if the cage 400 is used without any cover. Otherwise, the plant may also benefit from using a daylight harvester, which can use a light collector to collect daylight and illuminate the plant, thus reducing the requirements in terms of artificial lighting.

If the top dome surface 120 of the dome 100 is removable, or if the cage 400 is used without any cover, the top surface of the plant can be illuminated using an external lighting device which can be more intense. For example, the external lighting device can be CMH (ceramic metal halide), HPS (high pressure sodium), MH (metal halide) or other types of intense lighting for the top, while the light sources 200 on the supports act like supplemental lighting, especially for the lower leaves.

If having continuous lighting over time is not necessary, a timer can be added to control the lighting from the light sources 200. In that case, it may be desirable to modulate the start and the end of the lighting period to provided a soft start and a soft end (i.e., the transition from on/off or off/on is not instantaneous to make the transition smooth).

According to an embodiment, if a fan 410 is used, the dome 100 can comprise sensors which collect data upon which the decision to operate the fan 410 may be based, for example, a thermometer and a hygrometer.

A panel control board can be provided for a user to turn on/off or setup the light sources 200, the fan 410 and other controllable devices. A WiFi or Bluetooth® communication device can also be added for exporting data or for sending instructions to the control board of the dome remotely.

The power source for the dome 100 needed to operate the light sources 200 and, if relevant, the fans 410 and other electronics (such as a control board or a microcontroller or controller which receives data and controls any equipment such as the power fed to the light sources 200 via a power outlet or battery in view of the time or other indicators such as detected natural lighting), can come from an electrical connector plugged into an outlet, and/or from other sources such as a battery, a solar panel, and the like. A converter may be necessary if there is a type mismatch (in terms of AC or DC) between power sources and power consuming devices, and a transformer may also be necessary to adjust voltage.

According to an embodiment, the dome 100 is a dome for transport, i.e., a plant can be installed therein for transportation. In that case, storage in an enclosed environment such as a truck can be expected, hence the advantage of providing lighting directly into the dome 100.

Providing the power source as a battery is therefore advantageous since the power can be provided regardless of the location of the dome, i.e., the dome 100 is operable in a standalone manner, without wiring, where the battery is included with the dome and secured thereon or therein. The battery can be rechargeable when connecting the dome 100 to an electrical outlet (or using a solar panel) using appropriate circuitry to recharge the battery. The battery can also be replaceable.

According to an embodiment, in replacement of the battery or in addition thereto, wiring with an electrical connector can be provided to plug the dome 100 in a power outlet.

The additional lighting provided by the dome 100 or the cage 400 is useful to more evenly distribute the lighting over space along the height of the plant and from various angles not provided by natural lighting. Moreover, it is useful to make the lighting more constant or more significant/intense than natural lighting over time to compensate for weather changes. It can be used to light the plant during winter time to a level of illumination which is similar to the one received during the summer, thus avoiding the leaves getting yellow or fading in winter time, and to modify the existing light spectrum by adding new wavelengths and colors.

According to an embodiment, a light sensor may be provided to detect the current level of lighting. The power which is fed to the lighting sources 200 can then be controlled in accordance with the detected level of lighting to compensate for the level of lighting detected, i.e., if the level of lighting is low, than the power inputted into the lighting sources 200 and which is controlled by the controller can be increased to keep an overall illumination (natural+ artificial) to an acceptable total level. A clock and/or a calendar can be included in the controller to compare whether the detected level of lighting (detected by the light sensor) is lower than the expected lighting for that date and time and perform the lighting compensation accordingly.

In order to make the lighting even more constant over time to compensate for weather changes, a solar panel may be provided and advantageously located at a location where the sunlight is strong. The solar panel is used to collect natural light (i.e., sunlight) and convert it to electric power which is then stored in the battery described above. The battery may then be regulated to power the light sources 200 in a more controlled manner over time which makes the illumination more constant over time and avoids significant periods with low illumination. Accordingly, the lights can use the energy stored in the battery (or received from an external power source) to prolong the lighting period over the plant, intensify the light over the plant, modify the spectrum by adding colors or wavelengths not available in the ambient light, and provide light when ambient is not available. Control of the light operation maybe done using a timer or a control unit (e.g. panel control board) adapted to receive input from the user as to what program or illumination schedule to follow.

Figure 8:
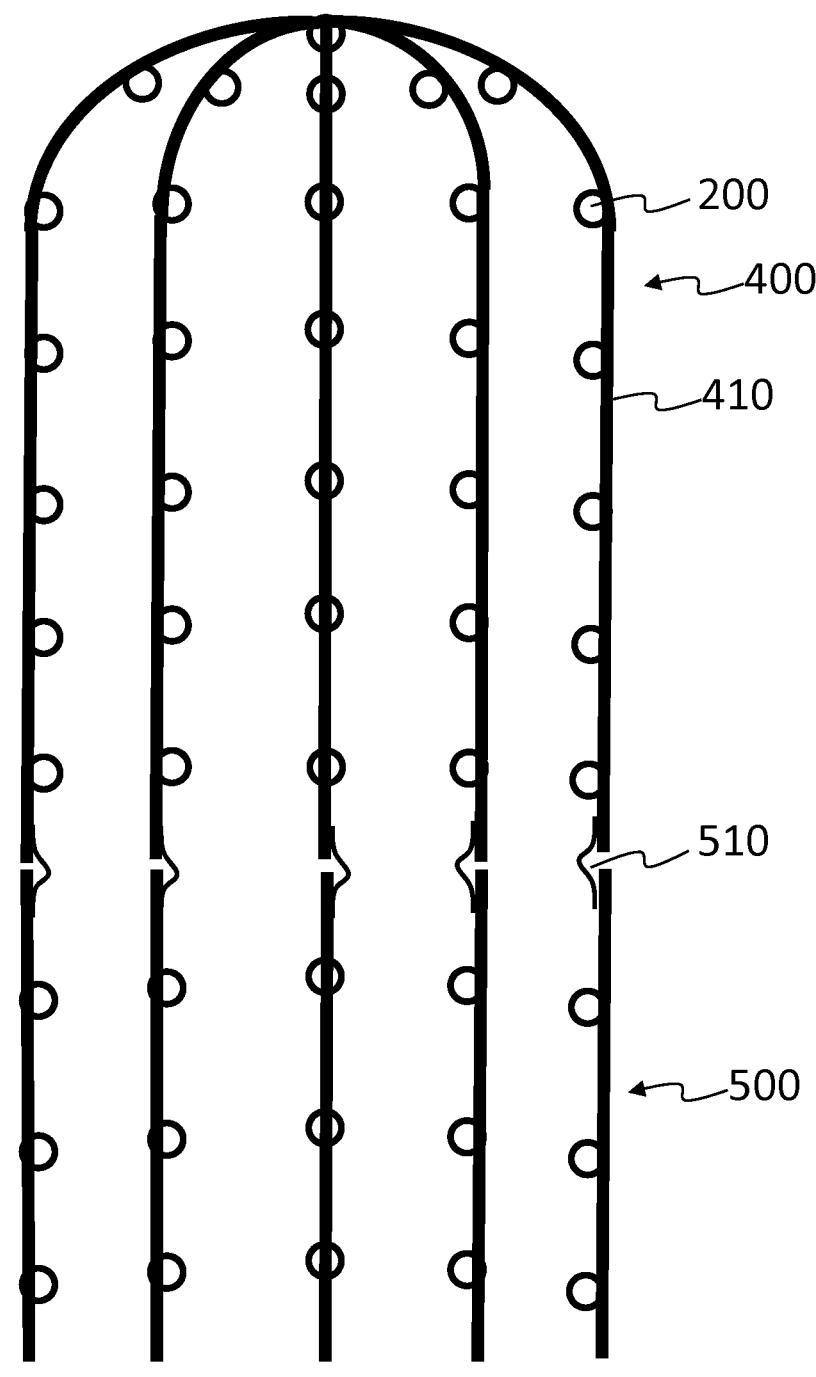
FIG. 8 is a side view illustrating a system for covering and/or growing a plant therein which comprises an extension with electrical connectors, according to an embodiment of the invention.

Now referring to FIG. 8, the dome 100 or the cage 400 can be provided with an extension 500 adapted to be operably connected to the dome/cage. In an embodiment, the extension may be adapted to match the diameter (or dimension in general) of the original dome 100 or cage 400 so that it can be installed below it to make the dome 100 or cage 400 taller as the plant grows over time. According to an embodiment, the extension 500 comprises the same kind of structure or frame which receives the light sources, or comprises the light sources themselves, in which case the extension comprises an electrical connection which connects to a complementary electrical connection on the dome 100 or cage 400. In an embodiment, the provision of electrical current to the extension occurs automatically when connecting the cage to the extension. For example, matching electrical connectors 510 may be provided which electrically connect the extension to the dome so that the extension 500 can also shine light on the lower section of the plants, as exemplified in FIG. 8, where the electrical connectors 510 provide electrical power to the light sources 200 of the extension 500.

Figure 9A:
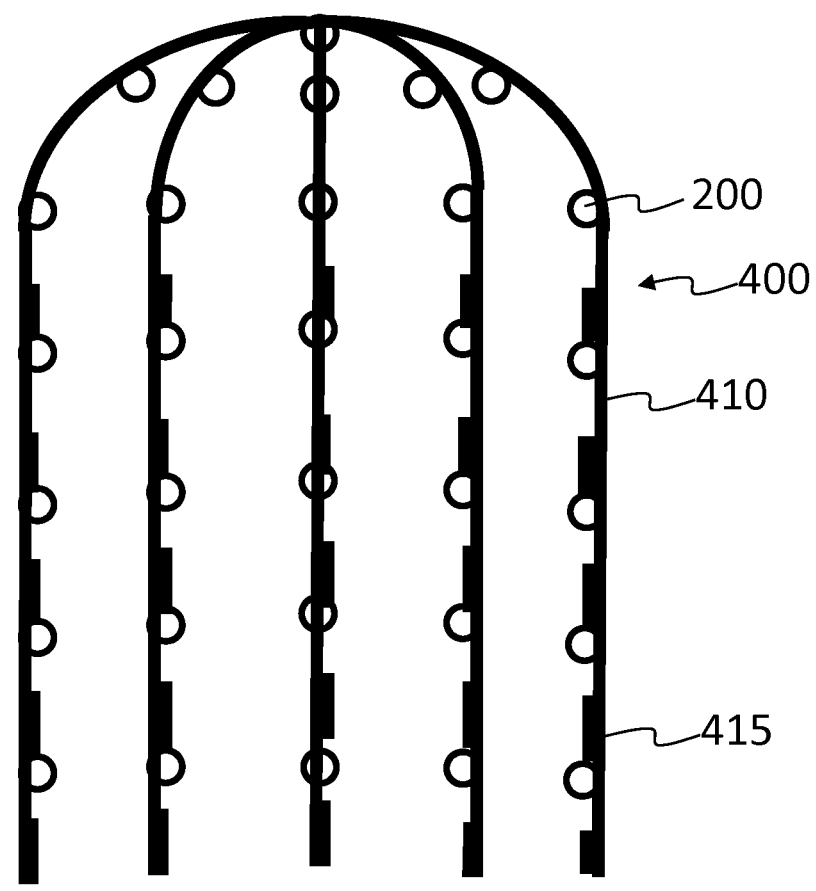
FIGS. 9A and 9B are side views illustrating a system for covering and/or growing a plant therein which comprises telescopic portions, shown in compacted position in FIG. 9A and in extended position in FIG. 9B, according to an embodiment of the invention.
Figure 9B:
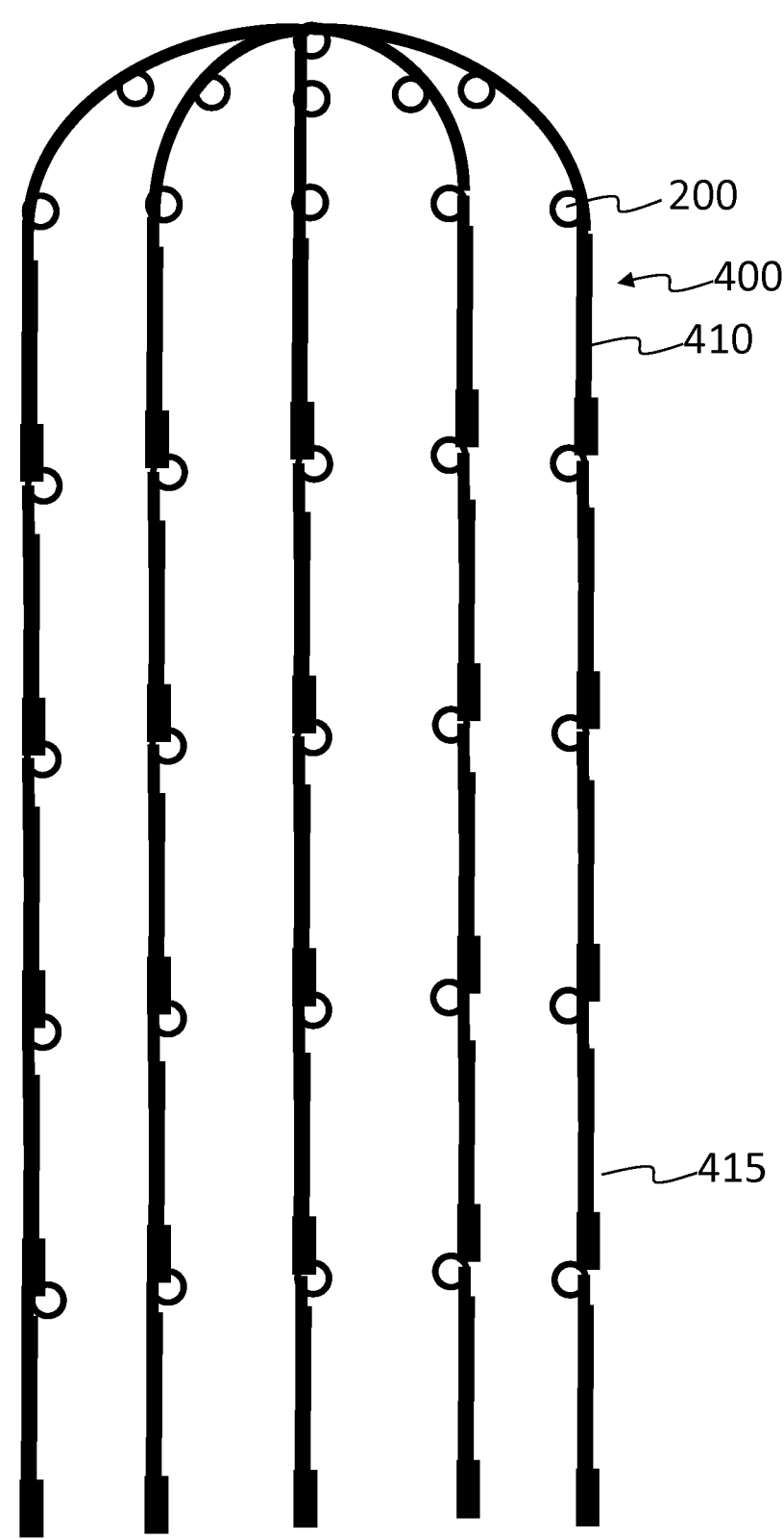

In another embodiment, the legs of the dome 100 or cage 400 are telescopic, making the dome 100 or cage 400 adaptable to the plant growing in height over time. The dome 100 or cage 400 can be provided in different sizes to accommodate for different types of plants of different sizes, as exemplified in FIGS. 9A & 9B. FIG. 9A illustrates the cage 400 with having on the arms 410 a telescopic portion 415. In FIG. 9A, the telescopic portion is in a compacted position, i.e., they are shortened, while in FIG. 9B, the arms 410 are in an extended position, i.e., they are each extended to accommodate for plant growth or simply to accommodate another plant which would be higher. The light sources 200 are more spaced from each other in the extended position than in the compacted position as a result of the extension of the telescopic portion 415 in between.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for lighting a plant which is planted in a pot or in the ground, the plant lighting method comprising the steps of:

providing a dome or a cage in a standalone manner, wherein the dome or the cage is distinct from the pot or from the ground and independently stands onto the pot or onto the ground defining an inner volume that at least partially surrounds and covers the plant, the dome or the cage comprising a plurality of arms that are extending vertically, each of the arms comprising telescopic sections telescoping relative to one another, whereby lengths of the arms are adjustable in a telescoping manner by telescoping the telescopic sections relative to one another;

providing a plurality of light sources fixedly supported by a plurality of telescopic sections of the arms of the dome or the cage, the plurality of light sources being distributed vertically over the arms from a bottom of the dome or the cage to a top of the dome or the cage and around the dome or the cage to surround the plant with light from the bottom to the top of the dome or the cage, wherein a height of each of the light sources that are mounted to one of the plurality of the telescopic sections are adjusted when telescoping the telescopic section of the arms the light source is mounted thereto relative to one another, the heights of the light sources and distance between at least two of the light sources being mounted to the same arm being thereby controllable, wherein, in a retracted telescoping position, the telescoping sections of the arms do not block any of the plurality of light sources;

controlling the light sources to perform one or more of: projecting light in the dark, extending ambient light hours, increasing an intensity of an existing ambient light, and modifying a spectrum of the existing ambient light in accordance with growth requirements specific to a given plant growing in a specific environment; and providing an extension comprising a plurality of light sources and an electrical connection, the extension being configured to match a dimension of the dome or the cage so that the extension can be operably installed below the dome or the cage to make the dome or cage taller, the electrical connection comprising matching electrical connectors that connect to a complementary electrical connection on the dome or the cage for electrically connecting the extension to the dome or the cage to provide electrical power to the plurality of light sources of the extension to shine light on a lower section of the plants.

2. The plant lighting method of claim 1, further comprising the steps of:

providing a solar panel on the dome or the cage;

providing the light sources with electric energy generated by the solar panel either directly or through a battery operably connected to the solar panel for storing the electric energy received from the solar panel; and operating the dome or the cage as a standalone unit independently of external energy sources.

3. The plant lighting method of claim 1, further comprising the steps of:

receiving a user input setting a lighting program; and controlling the light sources in accordance with the set program.

4. The plant lighting method of claim 1, further comprising the step of reinstalling the dome or the cage onto any other plant to surround said other plant with light from bottom to top during transportation, storage and normal growth in the specific environment thereof.

5. The plant lighting method of claim 1, wherein the step of controlling the plurality of light sources comprises increasing an intensity of an existing ambient light.

6. The plant lighting method of claim 1, wherein the step of controlling the plurality of light sources comprises modifying the spectrum of the existing ambient light in accordance with growth requirements specific to the given plant growing in the specific environment.

7. A system for lighting a plant which is planted in a pot or in the ground, the plant lighting system comprising:

a dome which is standalone in that the dome is distinct from the pot or from the ground and independently stands onto the pot or onto the ground forming an enclosure that at least partially surrounds and covers the plant, the dome comprising a plurality of arms that are extending vertically, each of the arms comprising telescopic sections whereby lengths of the telescopic sections of each of the arms of the dome are adjustable in a telescoping manner;

a plurality of light sources supported by the plurality of the telescopic sections of the arms of the dome, the plurality of light sources being distributed vertically over the arms from a bottom of the dome to a top of the dome and spaced around the dome to illuminate an inside of the dome, wherein a height of each of the light sources that are mounted to one of the plurality of the telescopic sections are adjusted when adjusting the lengths of the arms by telescoping the telescopic sections of the arms relative to one another, the heights of the light sources and distance between at least two of the light sources being mounted to the same arm being thereby controllable, wherein, in a retracted telescoping position, the telescoping sections of the arms do not block any of the plurality of light sources; and an extension comprising a plurality of light sources and an electrical connection, the extension configured to match a dimension of the dome so that the extension can be operably installed below the dome to make the dome taller, the electrical connection comprising matching electrical connectors that connect to a complementary electrical connection on the dome and which electrically connects the extension to the dome to provide electrical power to the plurality of light sources of the extension to shine light on a lower section of the plant, wherein the system is adapted to control the light sources to perform one or more of:

projecting light in the dark, extending ambient light hours, increasing an intensity of an existing ambient light and modifying a spectrum of the existing ambient light in accordance with growth requirements specific to a given plant growing in a specific environment, the system being used to surround the plant with light from bottom to top during transportation, storage and normal growth in the specific environment, while protecting the plant from animals, insects and harsh weather conditions.

8. The plant lighting system of claim 7, further comprising a solar panel operably connected to the plurality of light sources either directly or through a battery for operating the plant lighting system as a standalone unit independently of external energy sources.

9. The plant lighting system of claim 7, further comprising a control unit adapted to receive a user input setting a lighting program, the control unit being adapted to control operation of the plurality of light sources using the set program.

10. The plant lighting system of claim 7, wherein the dome comprises a top dome surface above the plant; and a lateral dome surface extending around the plant, a portion of the plurality of light sources being supported by the top dome surface and a remainder of the plurality of light sources being supported by the lateral dome surface.

11. The plant lighting system of claim 10, further comprising a fan at the top dome surface for evacuating air upwardly.

12. The plant lighting system of claim 11, wherein the top dome surface comprises a lid installed above the fan.

13. The plant lighting system of claim 12, further comprising a fan installed on the lid for evacuating air upwardly.

14. The plant lighting system of claim 11, further comprising a filter which is installed above the fan for filtering particles evacuated from the system.

15. The plant lighting system of claim 11, wherein the top dome surface and the lateral dome surface have perforations distributed vertically from the bottom of the dome to the top of the dome and around the dome, wherein the plurality of light sources can be mounted to the dome by being inserted into the perforations from outside of the dome to illuminate inside of the dome.

16. The plant lighting system of claim 15, wherein the plurality of light sources are light-emitting diodes having an illumination portion and an electronic portion, the illumination portion being directed toward the enclosure of the dome and the electronic portion remaining outside of the dome out of the enclosed inner volume.

17. The plant lighting system of claim 7, wherein the dome is made of a translucent material that allows ambient light to penetrate the dome.

18. The plant lighting system of claim 7, wherein the dome is made of an opaque material that does not allow ambient light into the dome.

19. The plant lighting system of claim 18, wherein the dome comprises a reflective layer on an inside surface of the dome to reflect and recycle the light generated by the light sources.

20. The plant lighting system of claim 7, wherein the extension is dimensioned to operably connect to the dome for extending the height of the enclosure defined by the dome, the extension comprising light sources distributed vertically from a bottom of the extension to a top of the extension and around the extension and being electrically connected to the dome so that operation of the plurality of light sources of the dome causes operation of the plurality of light sources of the dome extension.

21. The plant lighting system of claim 20, further comprising a control unit adapted to receive a user input setting a lighting program, the control unit being adapted to control operation of the plurality of light sources using the set program.

22. The plant lighting system of claim 7, wherein the plant lighting system is reinstallable on any other plant to surround said other plant with light from bottom to top during transportation, storage and normal growth in the specific environment thereof.

23. The plant lighting system of claim 7, wherein the plant lighting system is adapted to control the light sources to increase an intensity of an existing ambient light.

24. The plant lighting system of claim 7, wherein the plant lighting system is adapted to control the light sources to modify a spectrum of the existing ambient light in accordance with growth requirements specific to a given plant growing in a specific environment.

25. A system for lighting a plant which is planted in a pot or in the ground, the plant lighting system comprising:

a cage comprising self-supporting arms that are extending vertically and that are forming the cage which is standalone in that the cage is distinct from the pot or from the ground and independently stands onto the pot or onto the ground, the cage forming an enclosure that at least partially surrounds and extends over the plant, each of the arms comprising telescopic sections whereby lengths of the telescopic sections of each of the arms are adjustable in a telescoping manner;

a plurality of light sources supported by a plurality of telescopic sections of the arms of the cage, the plurality of light sources being distributed vertically over the arms from a bottom of the cage to a top of the cage and around the cage to illuminate an inside of the cage, wherein a location of each of the light sources are adjusted when adjusting the lengths of the arms by telescoping the telescopic sections of the arms relative to one another, the locations of light sources and distance between at least two of the light sources being mounted to the same arm being thereby controllable, wherein, in a retracted telescoping position, the telescoping sections of the arms do not block any of the plurality of light sources; and an extension adapted to be operably connected to the cage, the extension being adapted to match a dimension of the cage so that the extension can be installed below the cage to make the cage taller, the extension comprising an electrical connection comprising matching electrical connectors that connect to a complementary electrical connection on the cage for electrically connecting the extension to the cage to provide electrical power to the plurality of light sources of the extension to shine light on a lower section of the plants, wherein the plant lighting system is adapted to control the plurality of light sources to perform one or more of: projecting light in the dark, extending ambient light hours, increasing an intensity of an existing ambient light, and modifying a spectrum of the existing ambient light in accordance with growth requirements specific to a given plant growing in a specific environment, the system being used to surround the plant with light from bottom to top during transportation, storage and normal growth in the specific environment.

26. The plant lighting system of claim 25, further comprising a solar panel operably connected to the plurality of light sources either directly or through a battery for operating the plant lighting system as a standalone unit independently of external energy sources.

27. The plant lighting system of claim 25, wherein the extension is dimensioned to operably connect to the cage for extending the height of the cage, the extension comprising a plurality of light sources distributed vertically from a bottom of the extension to a top of the extension and around the extension and being electrically connected to the cage so that operation of the plurality of light sources of the extension is caused by the operation of the plurality of light sources of the cage.

28. The plant lighting system of claim 25, wherein the plant lighting system is reinstallable on any other plant to surround said other plant with light from bottom to top during transportation, storage and normal growth in the specific environment thereof.

29. The plant lighting system of claim 25, wherein the plant lighting system is adapted to control the light sources to increase an intensity of an existing ambient light.

30. The plant lighting system of claim 25, wherein the plant lighting system is adapted to control the light sources to modify a spectrum of the existing ambient light in accordance with growth requirements specific to a given plant growing in a specific environment.

* * * * *